(12) United States Patent
Tsuda

(10) Patent No.: US 9,775,146 B2
(45) Date of Patent: *Sep. 26, 2017

(54) MANAGEMENT SERVER, BASE STATION, COMMUNICATION SYSTEM, AND COMMUNICATION METHOD

(71) Applicant: Sony Corporation, Tokyo (JP)

(72) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,542

(22) Filed: Mar. 9, 2015

(65) Prior Publication Data

US 2015/0181594 A1 Jun. 25, 2015

Related U.S. Application Data

(63) Continuation of application No. 13/048,988, filed on Mar. 16, 2011, now Pat. No. 9,055,584.

(30) Foreign Application Priority Data

Mar. 25, 2010 (JP) ................................ 2010-070266

(51) Int. Cl.
*H04W 72/04* (2009.01)
*H04W 64/00* (2009.01)

(52) U.S. Cl.
CPC ... *H04W 72/0433* (2013.01); *H04W 72/0453* (2013.01); *H04W 64/00* (2013.01)

(58) Field of Classification Search
CPC ......... H04W 72/0453; H04W 72/0433; H04W 64/00

See application file for complete search history.

(56) References Cited

U.S. PATENT DOCUMENTS

| 6,212,388 B1 * | 4/2001 | Seo ................... H04W 16/10 370/329 |
| 8,441,997 B2 | 5/2013 | Yun et al. |
| 2004/0090944 A1 | 5/2004 | Ueno |

(Continued)

FOREIGN PATENT DOCUMENTS

| CN | 1492639 A | 4/2004 |
| EP | 2104386 A1 | 9/2009 |

(Continued)

OTHER PUBLICATIONS

U.S. Appl. No. 13/048,988, filed Mar. 16, 2011, Tsuda.
Japanese Office Action for Application No. 2013-225891 issued Jul. 29, 2014.

*Primary Examiner* — Brian D Nguyen
(74) *Attorney, Agent, or Firm* — Wolf, Greenfield & Sacks, P.C.

(57) ABSTRACT

There is provided a management server including a holding unit for holding a location/frequency list in which location information and frequency information are associated, a list creation unit for creating an available frequency list by extracting, from the location/frequency list, frequency information corresponding to location information received from a base station, and a list transmission unit for transmitting the available frequency list created by the list creation unit to the base station.

17 Claims, 8 Drawing Sheets

(56) References Cited

U.S. PATENT DOCUMENTS

| | | | |
|---|---|---|---|
| 2005/0008034 A1* | 1/2005 | Merkle | H04H 20/22 370/470 |
| 2005/0190701 A1 | 9/2005 | Bejerano et al. | |
| 2008/0220779 A1 | 9/2008 | Bose | |
| 2009/0098885 A1 | 4/2009 | Gogic et al. | |
| 2009/0156206 A1* | 6/2009 | Rathonyi | H04W 48/16 455/434 |
| 2009/0181672 A1 | 7/2009 | Horn et al. | |
| 2009/0221287 A1 | 9/2009 | Balasubramanian et al. | |
| 2010/0029233 A1* | 2/2010 | Chu | H04H 20/22 455/186.1 |
| 2010/0069062 A1 | 3/2010 | Horn et al. | |
| 2010/0111013 A1 | 5/2010 | Chou | |
| 2010/0260068 A1 | 10/2010 | Bhatt et al. | |
| 2011/0014920 A1 | 1/2011 | Nylander et al. | |
| 2011/0092220 A1 | 4/2011 | Bernini et al. | |
| 2011/0111745 A1 | 5/2011 | Li et al. | |
| 2011/0117916 A1* | 5/2011 | Dahlen | H04W 48/02 455/436 |
| 2011/0237268 A1 | 9/2011 | Tsuda | |

FOREIGN PATENT DOCUMENTS

| | | |
|---|---|---|
| JP | 2004-260371 | 9/2004 |
| JP | 2005-027189 A | 1/2005 |
| JP | 2005-333625 | 12/2005 |
| JP | 2006-191399 A | 7/2006 |
| JP | 2008-042451 A | 2/2008 |
| JP | 2008-211583 A | 9/2008 |
| JP | 2008-300989 A | 12/2008 |
| JP | 2010-527209 A | 8/2010 |
| WO | WO 2005/125249 A1 | 12/2005 |
| WO | WO 2006/054341 A1 | 5/2006 |
| WO | WO 2008/137994 A1 | 11/2008 |
| WO | WO 2009/050924 A1 | 4/2009 |
| WO | WO 2009/127254 A1 | 10/2009 |

* cited by examiner

| POSITION | UNUSED FREQUENCY |
|---|---|
| POSITION A | f1、f2、f3 |
| POSITION B | f1、f4 |
| ⋮ | ⋮ |

MANAGEMENT SERVER, BASE STATION, COMMUNICATION SYSTEM, AND COMMUNICATION METHOD

CROSS REFERENCES TO RELATED APPLICATIONS

This is a continuation of and claims the benefit under 35 U.S.C. §120 of U.S. patent application Ser. No. 13/048,988, now U.S. Pat. No. 9,055,584, issued on Jun. 9, 2015, titled "MANAGEMENT SERVER, BASE STATION, COMMUNICATION SYSTEM, AND COMMUNICATION METHOD," filed on Mar. 16, 2011, which claims the benefit under 35 U.S.C. §119 of Japanese Patent Application 2010-070266, filed on Mar. 25, 2010, each of which is hereby incorporated by reference in its entirety.

BACKGROUND OF THE INVENTION

Field of the Invention

The present invention relates to a management server, a base station, a communication system, and a communication method.

Description of the Related Art

A 3G mobile telephone service called the third generation was started in Japan in 2002. In the beginning, the main application was transmission of small packets such as sound and emails, but with the introduction of High Speed Downlink Packet Access (HSDPA) and the like, download of larger packets, such as download of music files or shared videos, has come to be performed.

As such, with the increase in the size of packets to be downloaded, wireless communications between a base station and a terminal were expanded, and HSPA+ service realizing maximum 1 Mbps was started. Furthermore, LTE that uses OFDMA in downlink is expected to start around 2010 and a 4G service is expected to start around 2015, and a world where maximum 1 Gbps is realized with a semi-fixed terminal and maximum 100 Mbps is realized in a mobile environment is becoming a reality.

To realize a wireless environment with a high communication rate as described above, it is assumed that cells will shift to microcells and picocells. Wireless environment of dead spots at the edge of a cell can be improved to a certain degree by placing relay stations, for example, but in the case resources of base stations are in short supply, the effect obtained by placing relay stations may be reduced.

Accordingly, in indoors having Fiber To The Home (FTTH), a high-speed data communication environment is anticipated to be realized without placing load on outdoor wireless resources, by placing small base stations called femtocell base stations.

Also, with respect to a white space which is an unused frequency band at a position or a region, it is becoming possible to use a frequency band in the white space without license if such frequency band can be decided to be not used. Therefore, it is expected that a technology for using a locally unused frequency band fairly and effectively will become important in the future.

Furthermore, a "special home zone" allowing frequency bands assigned to communications company to be freely used under the condition that no interference is caused to a public macrocell may possibly be permitted in the future. In such a case, the current configuration of femtocell base stations assuming operation in the frequency band assigned to each communications company may not be effective.

Thus, consideration is beginning to be given to a configuration of a base station that sets a frequency band in an autonomous, decentralized manner. For example, a configuration of storing frequency band information to be monitored in a base station, detecting receiving power of each frequency band, deciding that the use of a frequency band whose receiving power is at a threshold or less does not cause interference to a public macrocell, and using this frequency band as a carrier frequency is conceivable. Also, JP-A-2004-260371 discloses, as a centralized control structure, a repeater that sets a carrier frequency based on a frequency band which has been notified.

SUMMARY OF THE INVENTION

However, in the configuration above where a carrier frequency is set based on the receiving power at a base station, there is an underlying issue that, if measurement means of the receiving power is broken down, for example, a frequency band that causes interference to a public macrocell is erroneously used for the carrier frequency. Also, in the configuration above where a carrier frequency is set by centralized control, since a central control station assigns a frequency band without using location information of a target station (repeater), a case where communication by this target station becomes the cause of interference is conceivable.

In light of the foregoing, it is desirable to provide a management server, a base station, a communication system, and a communication method which are novel and improved, and which are capable of preventing a case where communication by a base station becomes a cause of interference, by appropriately assigning a frequency according to the location of the base station.

According to an embodiment of the present invention, there is provided a management server which includes a holding unit for holding a location/frequency list in which location information and frequency information are associated, a list creation unit for creating an available frequency list by extracting, from the location/frequency list, frequency information corresponding to location information received from a base station, and a list transmission unit for transmitting the available frequency list created by the list creation unit to the base station.

The management server may further include a list comparison unit for comparing the available frequency list transmitted to the base station and an available frequency list returned from the base station.

The list creation unit may create the available frequency list for each of a plurality of base stations whose cell areas are overlapped such that same frequency information is not included in the available frequency lists for the plurality of base stations.

The list creation unit may create the available frequency list for each of the plurality of base stations by using wireless setup information of each of the plurality of base stations received from each of the plurality of base stations.

The list creation unit may recreate, in a case creation or recreation of the available frequency list is requested by a base station belonging to a group formed from two or more base stations, the available frequency list of each base station belonging to the group.

The list creation unit may create the available frequency list based on the number of communication terminals belonging to the base station.

The list creation unit may include, in the available frequency list for the base station, a frequency band that is wider as the number of communication terminals belonging to the base station is larger.

According to another embodiment of the present invention, there is provided a base station which includes a wireless communication unit for wirelessly communicating with a communication terminal, a location information acquisition unit for acquiring location information, a location information transmission unit for transmitting the location information acquired by the location information acquisition unit to a management server that creates an available frequency list by extracting a frequency corresponding to the location information, and a frequency setting unit for setting a carrier frequency of the wireless communication unit according to the available frequency list received from the management server.

According to another embodiment of the present invention, there is provided a communication system which includes a base station including a wireless communication unit for wirelessly communicating with a communication terminal, a frequency setting unit for setting a carrier frequency of the wireless communication unit, a location information acquisition unit for acquiring location information, and a location information transmission unit for transmitting the location information acquired by the location information acquisition unit, and a management server including a holding unit for holding a location/frequency list in which location information and frequency information are associated, a creation unit for creating an available frequency list by extracting, from the location/frequency list, frequency information corresponding to the location information received from the base station, and a list transmission unit for transmitting the available frequency list created by the creation unit to the base station. The frequency setting unit sets the carrier frequency of the wireless communication unit according to the available frequency list received from the management server.

According to another embodiment of the present invention, there is provided a communication method including the steps of acquiring, by a base station, location information, transmitting, by the base station, the acquired location information to a management server holding a location/frequency list in which location information and frequency information are associated, creating, by the management server, an available frequency list by extracting, from the location/frequency list, frequency information corresponding to the location information received from the base station, transmitting, by the management server, the available frequency list to the base station, and setting, by the base station, a carrier frequency according to the available frequency list received from the management server.

According to the embodiments of the present invention described above, it is possible to prevent a case where communication by a base station becomes a cause of interference, by appropriately assigning a frequency according to the location of the base station.

DETAILED DESCRIPTION OF THE EMBODIMENT

Figure 1:
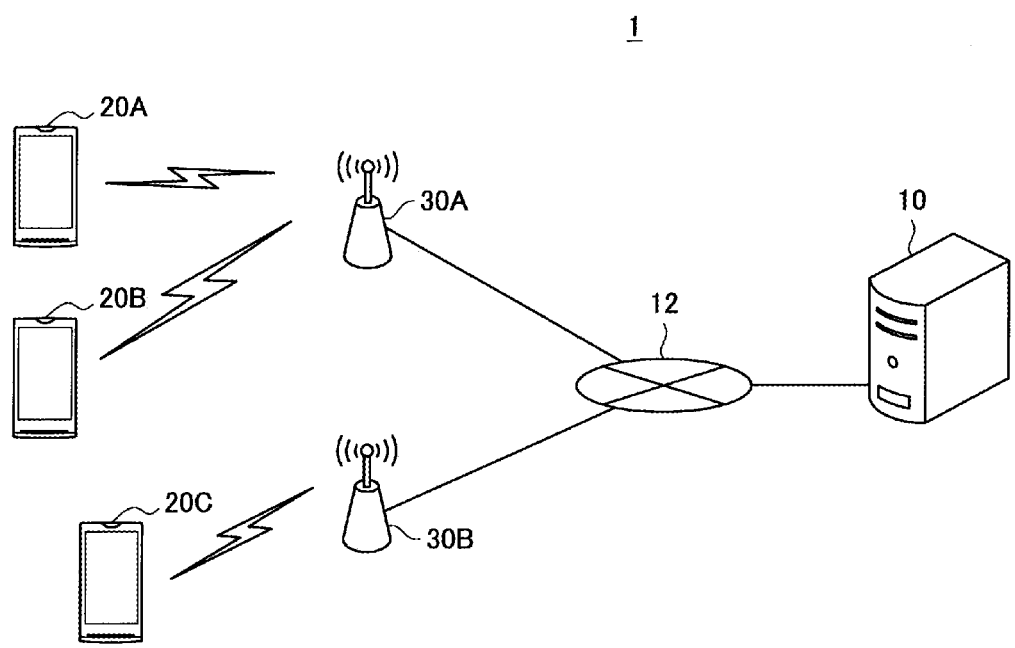
FIG. 1 is an explanatory diagram showing an overall configuration of a communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as femtocell base stations 30A and 30B. However, if it is not particularly necessary to distinguish each of a plurality of structural elements having substantially the same functional configuration, only the same reference numeral is assigned. For example, if it is not particularly necessary to distinguish between the femtocell base stations 30A and 30B, they are simply referred to as the femtocell base stations 30.

Additionally, "DETAILED DESCRIPTION OF THE EMBODIMENT" will be described in the item order below.
1. Overall Configuration of Communication System
2. First Embodiment
    2-1. Configurations of Management Server and Femtocell Base Station according to First Embodiment
    2-2. Operation of Communication System according to First Embodiment
3. Second Embodiment
4. Summary 1. Overall Configuration of Communication System First, an overall configuration of a communication system 1 according to the first and second embodiments of the present invention will be described with reference to FIG. 1.

FIG. 1 is an explanatory diagram showing the overall configuration of the communication system 1 according to the embodiment of the present invention. As shown in FIG. 1, the communication system 1 according to the embodiment of the present invention includes a management server 10, the Internet 12, femtocell base stations 30A and 30B, and communication terminals 20A to 20C.

The femtocell base station 30 is a small indoor base station compatible with a UMTS mobile phone wireless method standardized by 3GPP, for example, and can connect with the communication terminal 20 having a mobile phone interface compatible with the UMTS method. For example, in the example shown in FIG. 1, the femtocell base station 30A is connected with the communication terminals 20A and 20B, and the femtocell base station 30B is connected with the communication terminal 20C. Also, these femtocell base stations 30 are connected with the management server 10 via a broadband (BB) modem or a BB line and the Internet 12 or the like.

Additionally, the femtocell base station 30 is only an example of a base station controlling communication with the communication terminal 20, and the base station is not limited to the femtocell base station 30. For example, the embodiment of the present invention can also be applied to a base station such as a microcell base station, a picocell base station, and a relay station that relays communication between a macrocell base station and the communication terminal 20. Also, an example is shown in FIG. 1 where only the two femtocell base stations 30A and 30B are connected to the management server 10, but in reality, a large number of femtocell base stations 30 are assumed to connect to the management server 10.

The communication terminal 20 can perform data communication with another communication device via the femtocell base station 30. For example, the communication terminal 20 is capable of voice communication or exchange of content data such as video data and voice data via the femtocell base station 30.

Additionally, in FIG. 1, a mobile phone is shown as an example of the communication terminal 20, but the hardware of the communication terminal 20 is not limited to a mobile phone. For example, the communication terminal 20 may also be an information processing apparatus, such as a personal computer (PC), a home video processing apparatus (such as a DVD recorder or a video cassette recorder), a personal digital assistant (PDA), a home game machine, or a home appliance. Furthermore, the communication terminal 20 may also be an information processing apparatus such as a personal handyphone system (PHS), a portable music playback device, a portable video processing device, a portable game machine, or the like.

The management server 10 is installed in a communications company's network (core network of a communications company), for example, and performs authentication of the femtocell base station 30, the communication terminal 20, and the like. Also, the management server 10 holds an unused frequency list (location/frequency list) showing, for each position, a frequency band not used by a macrocell base station, for example.

Here, a method performed by a femtocell base station to autonomously detect an unused frequency is also conceivable as a method performed by a femtocell base station to set an unused frequency at the installation location as a carrier frequency. In the following, the method performed by a femtocell base station to autonomously detect an unused frequency will be specifically described with reference to FIG. 2.

Figure 2:
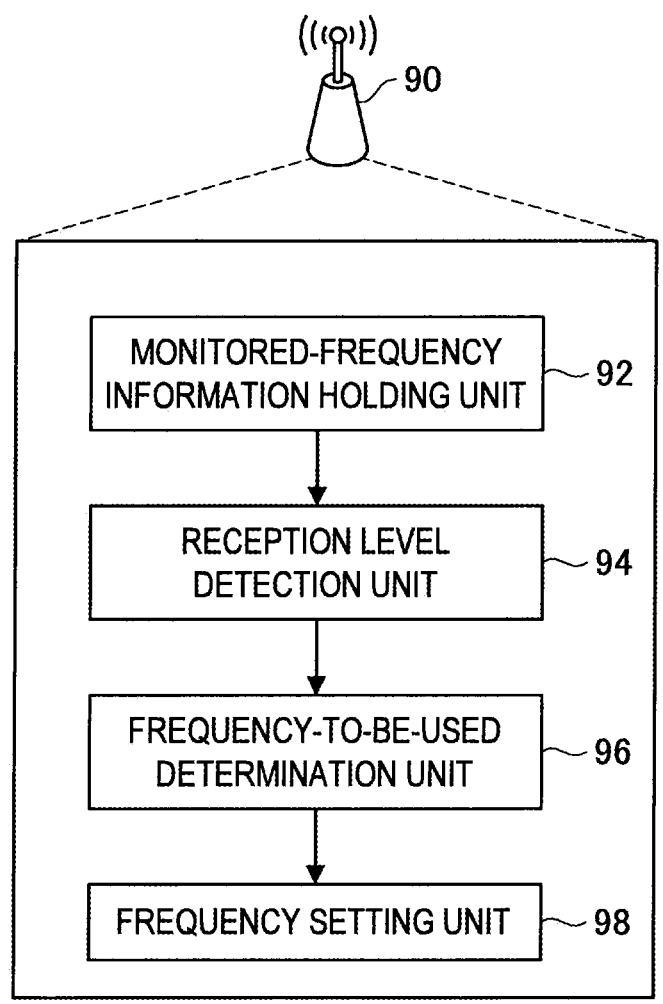
FIG. 2 is an explanatory diagram showing a configuration of a femtocell base station according to a comparison example.

FIG. 2 is an explanatory diagram showing a configuration of a femtocell base station 90 according to a comparison example. As shown in FIG. 2, the femtocell base station 90 according to the comparison example includes a monitored-frequency information holding unit 92, a reception level detection unit 94, a frequency-to-be-used determination unit 96, and a frequency setting unit 98.

Information on a frequency to be monitored is held in the monitored-frequency information holding unit 92, and the reception level detection unit 94 detects a reception level of a frequency indicated by the information held in the monitored-frequency information holding unit 92.

The interference to a public macrocell due to usage of a frequency whose reception level detected by the reception level detection unit 94 is below a threshold is considered to be limited. Accordingly, the frequency-to-be-used determination unit 96 determines a frequency whose reception level detected by the reception level detection unit 94 is below the threshold as the frequency to be used. Then, the frequency setting unit 98 sets the frequency to be used determined by the frequency-to-be-used determination unit 96 as a carrier frequency.

However, according to the configuration of this femtocell base station 90, there is an underlying issue that, if the reception level detection unit 94 is broken down, for example, a frequency that causes interference to a public macrocell is erroneously set as the carrier frequency. Furthermore, according to this configuration, it is assumed that the number of frequencies that can be used will be fewer for the femtocell base station 90 whose operation is started later, due to the use of frequencies by the femtocell base stations 90 whose operations have been started earlier. That is, unfairness due to the order of the timings of start of operation may arise.

Furthermore, it is assumed that there are many time slots in which wireless services by the femtocell base station 90 are not used, and thus it is assumed that a mechanism of variably assigning frequency bands according to the demand for wireless services will also be important.

Accordingly, the first and second embodiments of the present invention have come to be made from the standpoint of the circumstances described above. According to the embodiments of the present invention, it is possible to prevent a case where communication by the femtocell base station 30 becomes a cause of interference, to improve unfairness due to the order of the timings of start of operation, and to dynamically change a frequency band to be assigned. In the following, the first and second embodiments of the present invention will be described in detail.

2. First Embodiment (2-1. Configurations of Management Server and Femtocell Base Station According to First Embodiment)

Figure 3:
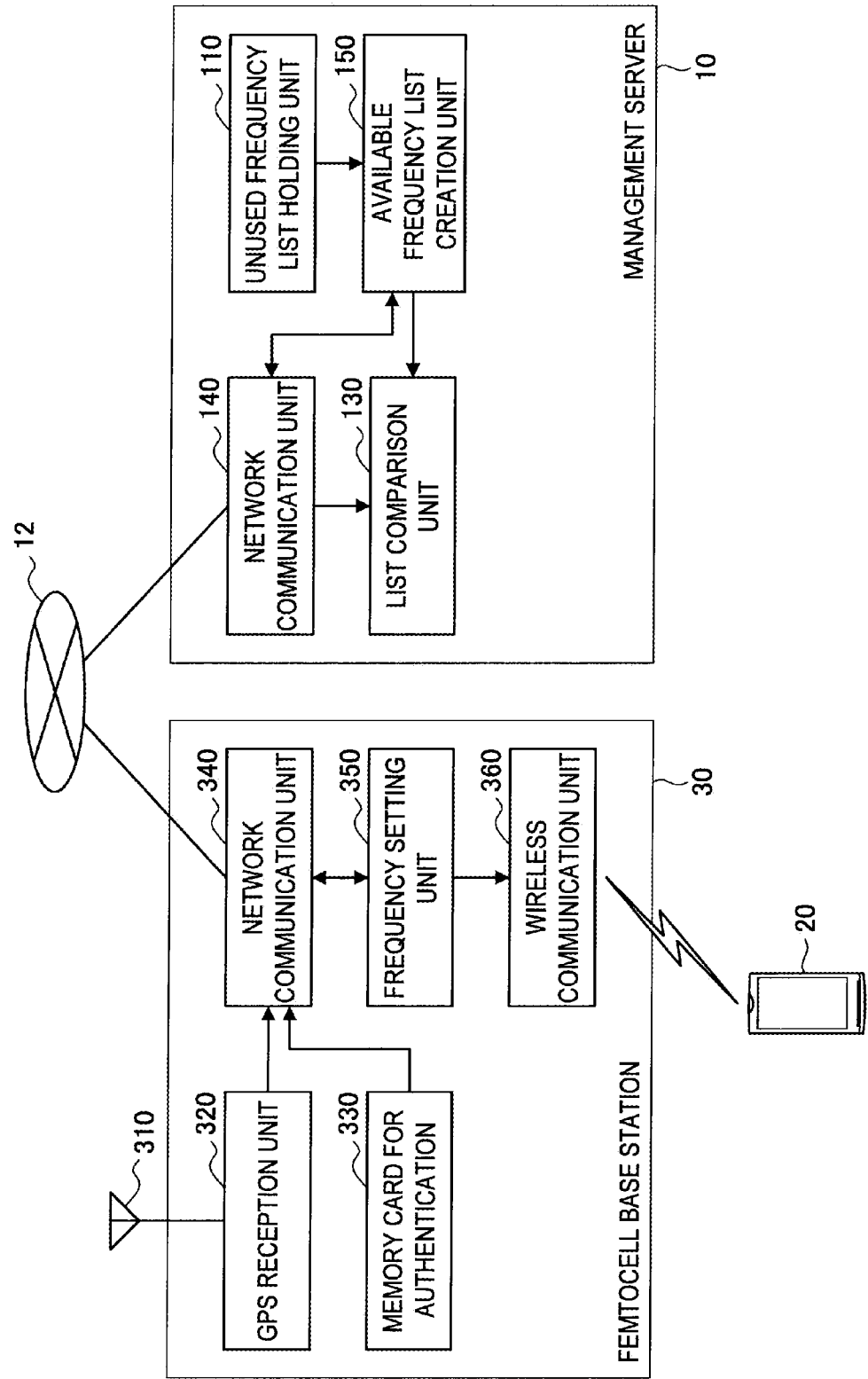
FIG. 3 is a function block diagram showing configurations of a management server and a femtocell base station 30 according to a first embodiment of the present invention.

FIG. 3 is a function block diagram showing configurations of the management server 10 and the femtocell base station 30 according to the first embodiment of the present invention.

As shown in FIG. 3, the management server 10 includes an unused frequency list holding unit 110, a list comparison unit 130, a network communication unit 140, and an available frequency list creation unit 150. Also, the femtocell base station 30 includes a GPS (Global Positioning System) antenna 310, a GPS reception unit 320, a memory card 330 for authentication, a network communication unit 340, a frequency setting unit 350, and a wireless communication unit 360.

The GPS antenna 310 of the femtocell base station 30 receives a navigation message transmitted from a satellite orbiting the Earth. The GPS reception unit 320 acquires location information of the femtocell base station 30 based on the navigation messages received by the GPS antenna 310 from a plurality of satellites.

As described, the GPS antenna 310 and the GPS reception unit 320 function as location information acquisition units for acquiring the location information of the femtocell base station 30. However, the GPS antenna 310 and the GPS reception unit 320 are only configuration examples for realizing the function of the location information acquisition unit, and the function of the location information acquisition unit may be realized by other configurations. For example, a configuration is also applicable of acquiring the current location information based on the reception timing or the receiving power of a wireless signal transmitted from a macrocell base station, a wireless LAN base station (access point) or the like.

Authentication information is stored in the memory card 330 for authentication, and authentication of the management server 10 and the femtocell base station 30 is performed based on this authentication information. According to such configuration, connection and operation of an illegal femtocell base station 30 can be prevented. Additionally, the memory card 330 for authentication may be a universal subscriber identity module (USIM) mounted by a subscriber of the femtocell base station 30, for example.

The network communication unit 340 exchanges various types of information with the management server 10 via the Internet 12. For example, the network communication unit 340 functions as a location information transmission unit for transmitting the location information of the femtocell base station 30 intermittently acquired by the GPS reception unit 320. Also, the network communication unit 340 receives an available frequency list from the management server 10, transmits wireless setup information of the wireless communication unit 360 to the management server 10, or returns, regularly or in response to an instruction from the management server 10, the available frequency list received from the management server 10.

The frequency setting unit 350 sets a carrier frequency of the wireless communication unit 360 based on the available frequency list received from the management server 10 by the network communication unit 340. Specifically, frequency bands that the femtocell base station 30 is allowed to use are described in the available frequency list, and the frequency setting unit 350 sets any of the frequency bands described in the available frequency list as the carrier frequency of the wireless communication unit 360.

The wireless communication unit 360 is an interface to the communication terminal 20. The wireless communication unit 360 performs transmission of wireless signals to the communication terminal 20 and reception of wireless signals from the communication terminal 20 by using the carrier frequency set by the frequency setting unit 350. In the following, a detailed configuration of the wireless communication unit 360 will be described with reference to FIG. 4.

Figures 4, 5:
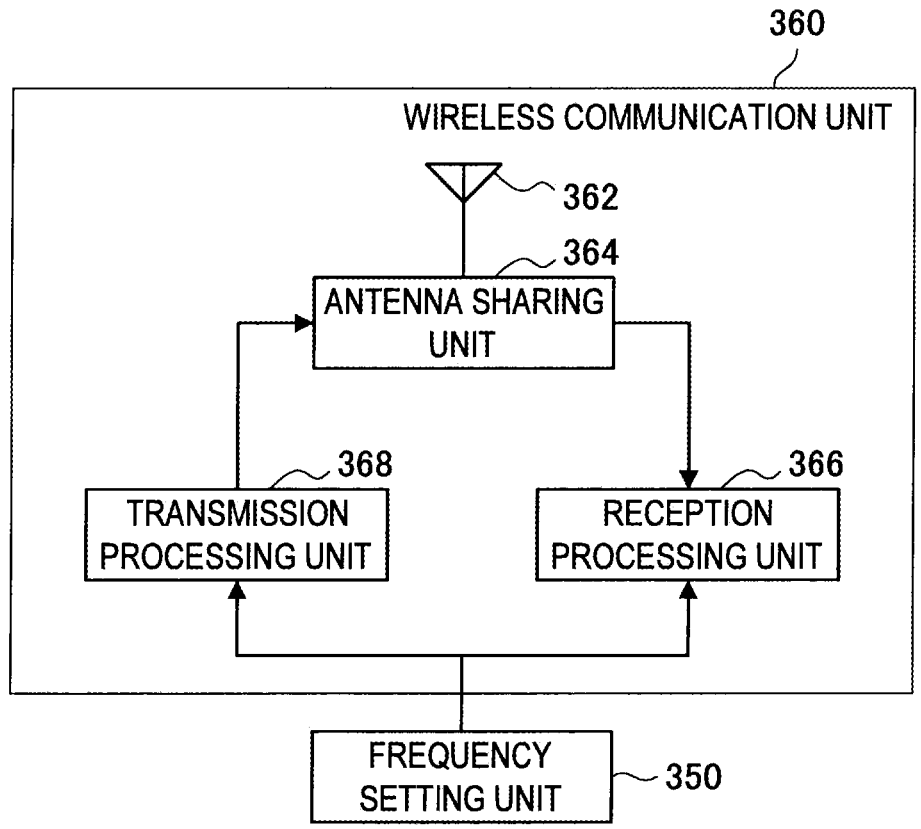
FIG. 4 is an explanatory diagram showing a configuration of a wireless communication unit.
FIG. 5 is an explanatory diagram showing a concrete example of an unused frequency list.

FIG. 4 is an explanatory diagram showing a configuration of the wireless communication unit 360. As shown in FIG. 4, the wireless communication unit 360 includes a wireless antenna 362, an antenna sharing unit 364, a reception processing unit 366, and a transmission processing unit 368.

At the time of reception, the wireless antenna 362 and the reception processing unit 366 are connected by the antenna sharing unit 364. Then, the wireless antenna 362 converts a wireless signal which has been received to an electrical received signal, and supplies the same to the reception processing unit 366. The reception processing unit 366 performs a receiving process (for example, down-conversion) so as to acquire information on the frequency band of the carrier frequency set by the frequency setting unit 350.

At the time of transmission, the wireless antenna 362 and the transmission processing unit 368 are connected by the antenna sharing unit 364. Then, the transmission processing unit 368 processes (for example, up-converts) a transmission signal so that a wireless signal is transmitted in the frequency band of the carrier frequency set by the frequency setting unit 350, and the wireless antenna 362 transmits the wireless signal based on the transmission signal supplied from the transmission processing unit 368.

Additionally, the frequency setting unit 350 may set all the frequency bands described in the available frequency list as the carrier frequencies, or may set some of the frequency bands described in the available frequency list as the carrier frequencies. Furthermore, the frequency setting unit 350 can variably set not only the carrier frequency but also wireless parameters such as a modulation method, transmission power and a scramble code.

The network communication unit 140 of the management server 10 exchanges various types of information with the femtocell base station 30 via the Internet 12. For example, the network communication unit 140 functions as a list transmission unit for transmitting an available frequency list created by the available frequency list creation unit 150. Also, the network communication unit 140 intermittently receives the location information of the femtocell base station 30 from the femtocell base station 30, receives wireless setup information from the femtocell base station 30, or receives an available frequency list returned from the femtocell base station 30.

The unused frequency list holding unit 110 holds an unused frequency list (location/frequency list) compiled from information on locally unused frequencies. As shown in FIG. 5, a position (location information) and an unused frequency band are associated in this unused frequency list. In the example shown in FIG. 5, frequency bands f1, f2, and f3 are the unused frequency bands at position A.

Additionally, the expression method of each position is not particularly limited. For example, each position may be expressed by a latitude range and a longitude range, such as "35.01 to 35.02 north latitudes, 135.01 to 135.03 east longitudes," or may be expressed by a centre position and a radius distance, such as "centre position: 35.01 north latitude, radius 500 m."

The available frequency list creation unit 150 (list creation unit) creates the available frequency list for the femtocell base station 30 based on the unused frequency list held in the unused frequency list holding unit 110 and the location information of the femtocell base station 30 received from the femtocell base station 30 by the network communication unit 140.

Specifically, the available frequency list creation unit 150 extracts unused frequencies corresponding to the location information of the femtocell base station 30 from the unused frequency list, and creates the available frequency list. For example, if the location information of the femtocell base station 30 is within the range of position A, the available frequency list creation unit 150 extracts frequencies f1, f2, and f3 from the unused frequency list shown in FIG. 5, and creates an available frequency list including frequencies f1, f2, and f3.

Additionally, the femtocell base station 30 does not necessarily use all the frequencies included in the available frequency list. For example, sometimes, the femtocell base station 30 uses only frequency f1 in the available frequency list including frequencies f1, f2, and f3. With such a case in mind, the available frequency list creation unit 150 may recreate the available frequency list for the femtocell base station 30 by perceiving the frequency being used by the femtocell base station 30 based on the wireless setup information received from the femtocell base station 30. For example, in a case the femtocell base station 30 is using only frequency f1, the available frequency list creation unit 150 may recreate the available frequency list including only frequency f1. According to such configuration, it is possible to assign other frequencies such as frequencies f2 and f3 to other femtocell base stations 30 as available frequencies.

As described, by providing the available frequency list creation unit 150 in the management server 10, the available frequency list creation unit 150 is managed by an organization which is at least licensed to provide public services or for which equal reliability is guaranteed, and thus the security of the system can be ensured.

Furthermore, the femtocell base station 30 intermittently transmits the location information to the management server 10. Accordingly, even if the installation location of the femtocell base station 30 is intentionally or accidentally moved, the available frequency list creation unit 150 can create the available frequency list according to the installation location after the move, and thus a case where a frequency band which can become the cause of interference is used by the femtocell base station 30 can be prevented.

Additionally, there may also be assumed a case where the location information is not received from the femtocell base station 30 due to breakdown of the GPS reception unit 320 or the like. In such a case, the available frequency list creation unit 150 may, as fail-safe control, create the available frequency list based on an address included in subscriber information of the femtocell base station 30.

Furthermore, the list comparison unit 130 of the management server 10 compares the available frequency list transmitted to the femtocell base station 30 and the available frequency list returned from the femtocell base station 30. According to this configuration, the available frequency list can be prevented from being rewritten without authorization on the side of the femtocell base station 30, thereby preventing use of an illegal frequency band.

(Creation Method of Available Frequency List)

Here, the creation method of the available frequency list will be described in greater detail. In the above, an example where the location information received from the femtocell base station 30 is used for creation has been described, but in the following, an example where the wireless setup information of the femtocell base station 30 is also used in addition to the location information will be described.

Figure 6:
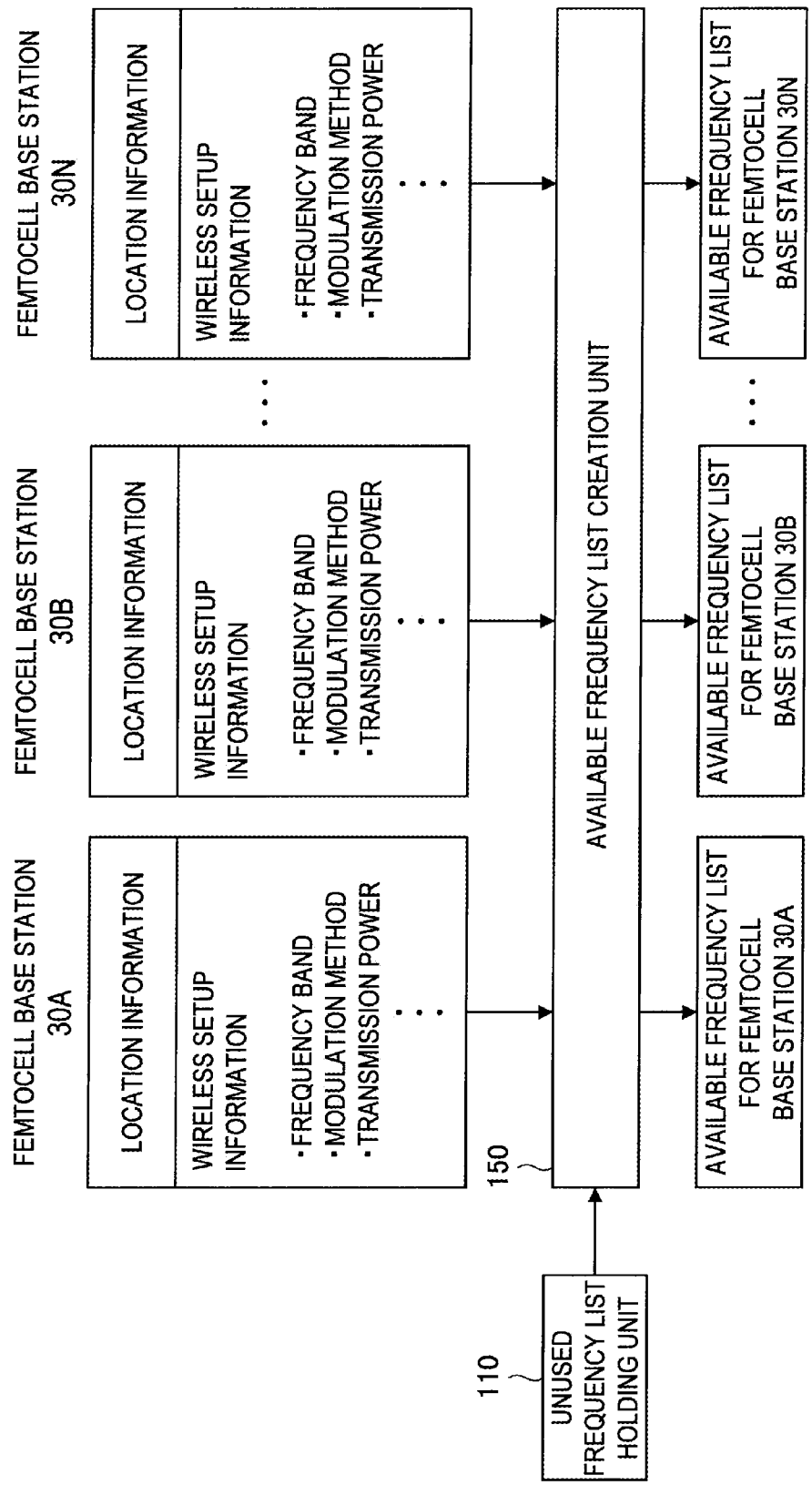
FIG. 6 is an explanatory diagram schematically showing a creation process of an available frequency list creation unit for an available frequency list.

FIG. 6 is an explanatory diagram schematically showing a creation process of the available frequency list creation unit 150 for the available frequency list. As shown in FIG. 6, the available frequency list creation unit 150 creates the available frequency list for each femtocell base station 30 based on the location information and the wireless setup information received from each femtocell base station 30 and the unused frequency list held in the unused frequency list holding unit 110. Additionally, as the wireless setup information, various wireless parameters such as a frequency band used as a carrier, a modulation method, and transmission power can be cited.

Figure 7:
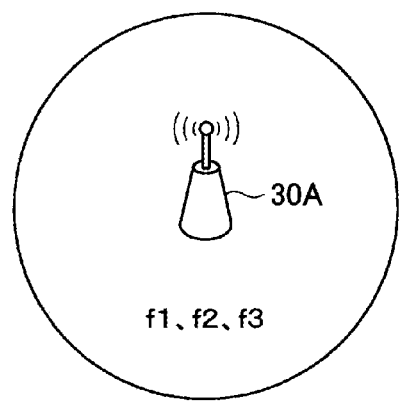
FIG. 7 is an explanatory diagram showing a relationship between an installation location of a femtocell base station and an available frequency.

For example, a case is considered as shown in FIG. 7 where it is decided, based on information received from each femtocell base station 30, that there is no other femtocell base station 30 near the femtocell base station 30A installed within the range of position A. In this case, the available frequency list creation unit 150 can assign all of frequencies f1, f2, and f3 that are not used at position A to the femtocell base station 30A as available frequencies.

Figure 8:
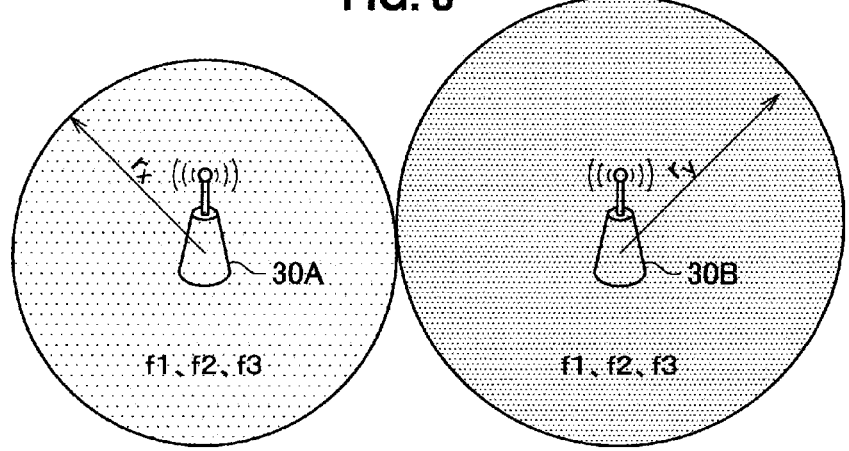
FIG. 8 is an explanatory diagram showing a relationship between an installation location of a femtocell base station and an available frequency.

Also, a case is considered as shown in FIG. 8 where it is decided, based on information received from each femtocell base station 30, that the femtocell base stations 30A and 30B are present within the range of position A. Here, the square of radius rx of the cell area of the femtocell base station 30A is proportional to the transmission power of the femtocell base station 30A, and the square of radius ry of the cell area of the femtocell base station 30B is proportional to the transmission power of the femtocell base station 30B. Therefore, radii rx and ry of the cell areas of the femtocell base stations 30A and 30B can be each calculated based on the transmission power included in the wireless setup information.

When it is decided by the calculation above that, as shown in FIG. 8, the cell areas of the femtocell base stations 30A and 30B do not overlap, it is assumed that no interference is caused even if the femtocell base stations 30A and 30B use the same frequency. Accordingly, the available frequency list creation unit 150 can assign all of frequencies f1, f2, and f3 that are not used at position A to both of the femtocell base stations 30A and 30B as the available frequencies.

Figure 9:
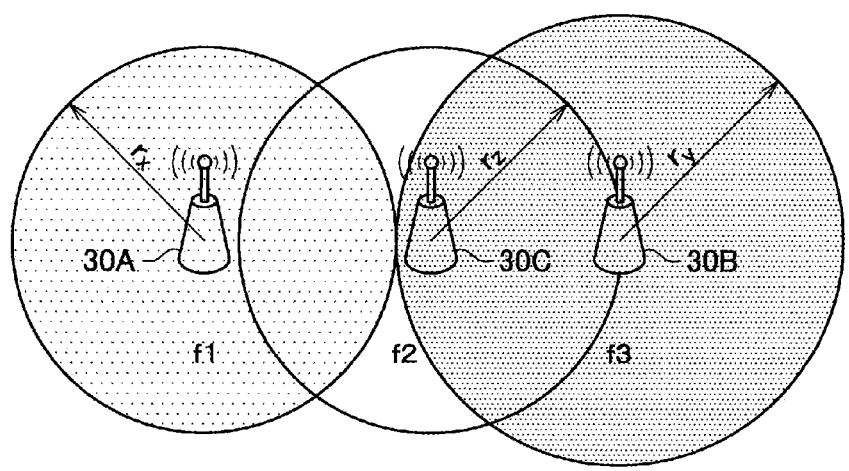
FIG. 9 is an explanatory diagram showing a relationship between an installation location of a femtocell base station and an available frequency.

A case is considered where operation of the femtocell base station 30C is then started at a position where its cell area overlaps with the cell areas of the femtocell base stations 30A and 30B, as shown in FIG. 9. The available frequency list creation unit 150 creates, for interference prevention, the available frequency list for each of the femtocell base stations 30 in such a way that the same frequency is not included in the available frequency lists of femtocell base stations 30 whose cell areas overlap. Therefore, in a case operation of the femtocell base station 30C is started as described above, if unused frequencies f1, f2, and f3 are all already assigned to the femtocell base stations 30A and 30B, it is not possible to assign an available frequency to the femtocell base station 30C.

Thus, in the present embodiment, a configuration is adopted where the available frequency lists for the femtocell base stations 30A and 30B are recreated at the time of start of operation of the femtocell base station 30C so that no unfairness arises due to the order of the timings of start of operation.

For example, in the case operation of the femtocell base station 30C is to be started, the available frequency list creation unit 150 recreates the available frequency list including frequency f1 for the femtocell base station 30A, recreates the available frequency list including frequency f3 for the femtocell base station 30B, and recreates the available frequency list including frequency f2 for the femtocell base station 30C, as shown in FIG. 9.

As has been described above, by recreating, in the case operation of a new femtocell base station is to be started, the available frequency lists for other femtocell base stations whose cell areas overlap with that of the new femtocell base station, frequency resources can be fairly and effectively used by respective femtocell base stations without being affected by the order of the timings of start of operation of respective femtocell base stations.

Additionally, in the above, an example has been described where the available frequency list is recreated for an existing femtocell base station whose cell area overlaps with that of the new femtocell base station, but the present invention is not limited to such an example. For example, the management server 10 may group a plurality of femtocell base stations 30 based on addresses included in pieces of subscriber information of the femtocell base stations 30 or of a BB line, and may recreate the available frequency list on a per-group basis.

Furthermore, the timing of recreating the available frequency list is not limited to the timing of start of operation of a new femtocell base station. For example, the available frequency list creation unit 150 may recreate the available frequency lists for a plurality of femtocell base stations 30 with the overlapping cell areas or that are in the same group, in response to a request from an existing femtocell base station 30.

(2-2. Operation of Communication System According to First Embodiment)

In the foregoing, the configurations of the femtocell base station 30 and the management server 10 according to the first embodiment have been described. Next, an operation of the communication system 1 according to the first embodiment will be described with reference to FIG. 10.

Figure 10:
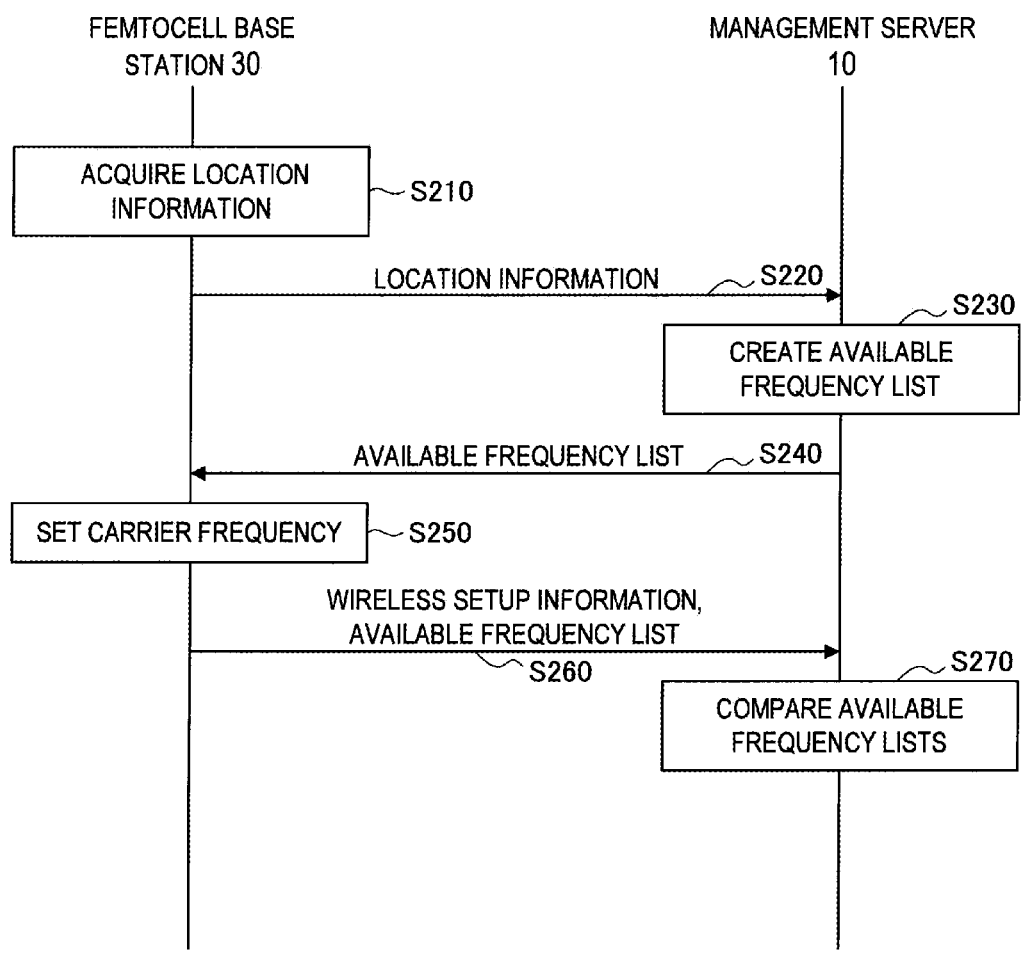
FIG. 10 is a sequence chart showing an operation of a communication system according to the first embodiment.

FIG. 10 is a sequence chart showing an operation of the communication system 1 according to the first embodiment. As shown in FIG. 10, first, the GPS reception unit 320 of the femtocell base station 30 acquires the location information of the femtocell base station 30 (S210). Then, the network communication unit 340 of the femtocell base station 30 transmits the location information acquired by the GPS reception unit 320 to the management server 10 (S220).

Next, the available frequency list creation unit 150 of the management server 10 creates the available frequency list based on the unused frequency list held by the unused frequency list holding unit 110 and the location information received from the femtocell base station 30 (S230). Specifically, the available frequency list creation unit 150 creates the available frequency list by extracting unused frequency corresponding to the location information of the femtocell base station 30 from the unused frequency list.

Furthermore, the network communication unit 140 of the management server 10 transmits the available frequency list created by the available frequency list creation unit 150 to the femtocell base station 30 (S240).

Then, when the available frequency list is received from the management server 10, the frequency setting unit 350 of the femtocell base station 30 sets all or some of the frequencies included in the available frequency list as the carrier frequency of the wireless communication unit 360 (S250). Next, the network communication unit 340 of the femtocell base station 30 transmits the wireless setup information of the wireless communication unit 360 to the management server 10, and returns the available frequency list received from the management server 10 to the management server 10 (S260).

Then, the list comparison unit 130 of the management server 10 compares the available frequency list transmitted to the femtocell base station 30 and the available frequency list returned from the femtocell base station 30 (S270). This can prevent the available frequency list from being rewritten without authorization on the side of the femtocell base station 30, thereby preventing use of an illegal frequency band.

Furthermore, with the processes of S210 to S270 being repeated by the management server 10 and the femtocell base station 30, even if the installation location of the femtocell base station 30 is moved, the available frequency list according to the installation location after the move can be created. As a result, use of a frequency band which can be a cause of interference by the femtocell base station 30 can be prevented.

3. Second Embodiment

In the foregoing, the first embodiment of the present invention has been described. Next, the second embodiment of the present invention will be described with reference to FIG. 11.

Figure 11:
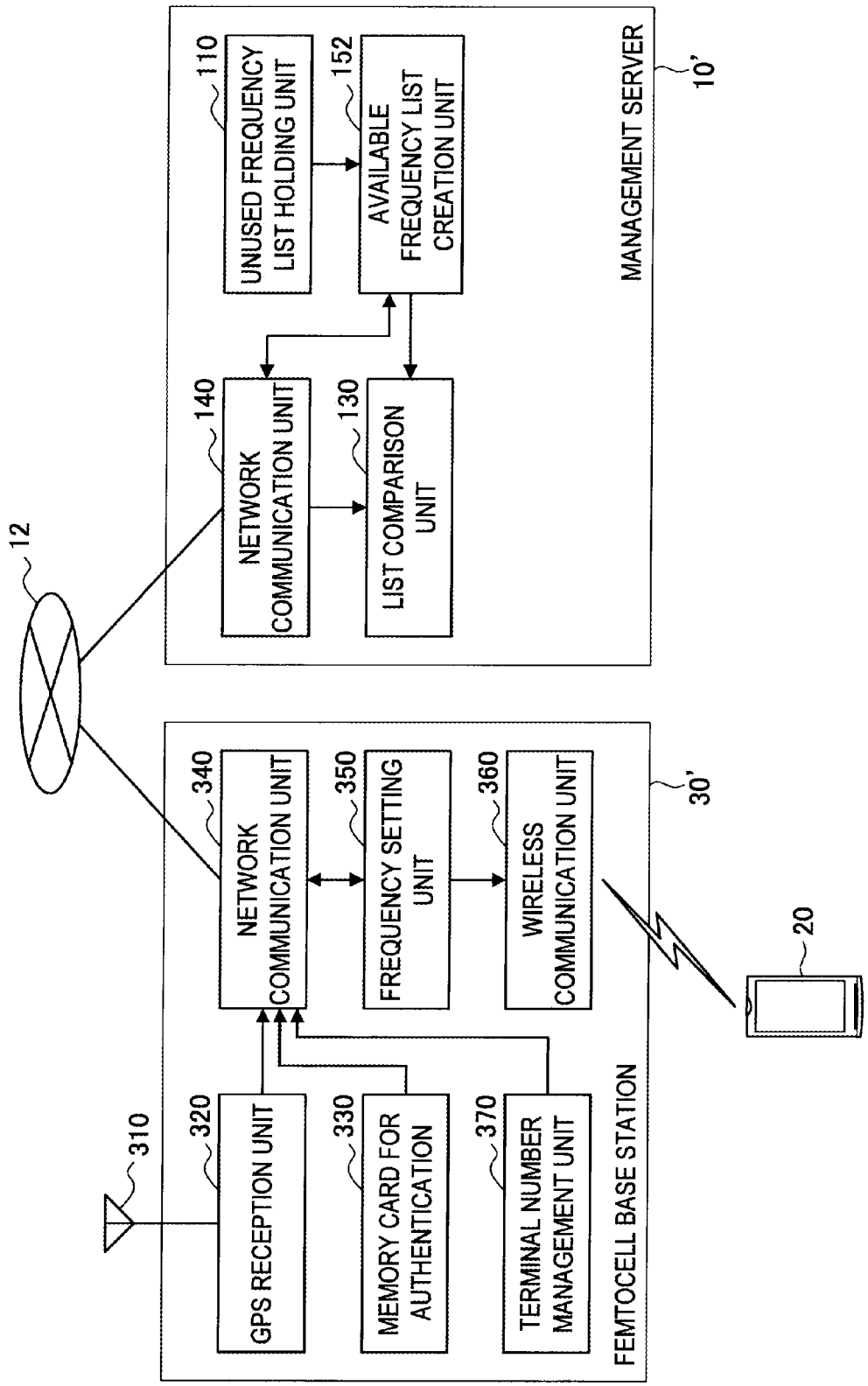
FIG. 11 is a function block diagram showing configurations of a management server and a femtocell base station according to a second embodiment of the present invention.

FIG. 11 is a function block diagram showing configurations of a management server 10' and a femtocell base station 30' according to the second embodiment of the present invention. As shown in FIG. 11, the management server 10' includes an unused frequency list holding unit 110, a list comparison unit 130, a network communication unit 140, and an available frequency list creation unit 152. Also, the femtocell base station 30' includes a GPS antenna 310, a GPS reception unit 320, a memory card 330 for authentication, a network communication unit 340, a frequency setting unit 350, a wireless communication unit 360, and a terminal number management unit 370.

Additionally, the management server 10' and the femtocell base station 30' according to the second embodiment of the present invention share the common configurations with the management server 10 and the femtocell base station 30 according to the first embodiment, and thus explanation will be mainly given on the difference between the first and second embodiments.

The terminal number management unit 370 of the femtocell base station 30' manages the number of communication terminals 20 belonging to the femtocell base station 30'. Specifically, the terminal number management unit 370 manages the number of communication terminals 20 present within the cell area of the femtocell base station 30' or the number of communication terminals 20 currently connected to the femtocell base station 30'.

The network communication unit 340 of the femtocell base station 30' transmits the number of terminals managed by the terminal number management unit 370 to the management server 10' via the Internet 12, and the network communication unit 140 of the management server 10' receives the number of terminals.

The available frequency list creation unit 152 of the management server 10' creates an available frequency list for the femtocell base station 30' based on, in addition to location information and wireless setup information of the femtocell base station 30', the number of terminals received by the network communication unit 140.

Specifically, in the case the number of communication terminals 20 belonging to the femtocell base station 30' is small, the available frequency list creation unit 152 assigns a narrow frequency band to the femtocell base station 30' as the available frequency. On the other hand, in the case the number of communication terminals 20 belonging to the femtocell base station 30' is large, the available frequency list creation unit 152 assigns a wide frequency band to the femtocell base station 30' as the available frequency. Also, the terminal number management unit 370 may also have a function of performing weighting, taking into account information on Quality of Service (QoS) desired by each terminal. For example, in the case a terminal starts an application for which high QoS is wanted, the terminal is notified to the management server 10' to be more than one terminal, thereby enabling assignment of a wide frequency band to the femtocell base station 30' as the available frequency.

According to such a configuration, frequency resources can be dynamically assigned to each femtocell base station 30' according to communication demand, and thus an appropriate amount of frequency resources can be distributed to each femtocell base station 30'.

4. Summary

As has been described above, in the embodiment of the present invention, by providing the available frequency list creation unit 150 (152) to the management server 10 (10'), the available frequency list creation unit 150 (152) is managed by an organization which is at least licensed to provide public services or which is trusted with equal reliability, and thus the security of the system can be ensured.

Furthermore, the femtocell base station 30 (30') intermittently transmits location information to the management server 10 (10'). Accordingly, even if the installation location of the femtocell base station 30 (30') is intentionally or accidentally moved, the available frequency list creation unit 150 (152) can create an available frequency list according to the installation location after the move, and thus a case where a frequency band which can become the cause of interference is used by the femtocell base station 30 (30') can be prevented.

Furthermore, the list comparison unit 130 of the management server 10 (10') compares the available frequency list transmitted to the femtocell base station 30 (30') and the available frequency list returned, periodically or in response to an instruction from the management server 10 (10'), from the femtocell base station 30 (30'). According to this configuration, the available frequency list can be prevented from being rewritten without authorization on the side of the femtocell base station 30 (30'), thereby preventing use of an illegal frequency band.

Furthermore, by recreating, in the case operation of a new femtocell base station is to be started, the available frequency lists for other femtocell base stations whose cell areas overlap with that of the new femtocell base station, frequency resources can be fairly and effectively used by respective femtocell base stations without being affected by the order of the timings of start of operation of respective femtocell base stations.

Furthermore, according to the second embodiment of the present invention, frequency resources can be dynamically assigned to each femtocell base station 30' according to communication demand, and thus an appropriate amount of frequency resources can be distributed to each femtocell base station 30'.

It should be understood by those skilled in the art that various modifications, combinations, sub-combinations and alterations may occur depending on design requirements and other factors insofar as they are within the scope of the appended claims or the equivalents thereof.

For example, the steps of the processing of the communication system 1 according to the present specification do not necessarily have to be processed chronologically according to the order described as the sequence chart. For example, the steps of the processing of the communication system 1 can also be processed in an order different from that described as the sequence chart or may be processed in parallel.

Furthermore, a computer program for causing hardware, such as a CPU, a ROM, or a RAM, embedded in the femtocell base station 30 or in the management server 10 to realize an equivalent function as each element of the femtocell base station 30 or of the management server 10 described above can also be created. Furthermore, a storage medium storing the computer program is also provided.

The present application contains subject matter related to that disclosed in Japanese Priority Patent Application JP 2010-070266 filed in the Japan Patent Office on Mar. 25, 2010, the entire content of which is hereby incorporated by reference.

What is claimed is:

1. A management server comprising:
at least one processor configured to:
hold a location/frequency list in which location information and frequency information are associated;
create a first available frequency list by extracting, from the location/frequency list, frequency information based on wireless setup information of a base station received from the base station,
wherein the wireless setup information comprises a transmission power; and
transmit the first available frequency list to the base station.

2. The management server according to claim 1, wherein the at least one processor is further configured to:
compare the first available frequency list transmitted to the base station and a second available frequency list returned from the base station.

3. The management server according to claim 1, wherein cell areas of a plurality of base stations are overlapped such that same frequency information is not included in available frequency lists for the plurality of base stations.

4. The management server according to claim 1, wherein the at least one processor is further configured to:
recreate, in a case where creation or recreation of the first available frequency list is requested by a base station belonging to a group formed from two or more base stations, the first available frequency list of each base station belonging to the group.

5. The management server according to claim 1, wherein the first available frequency list is created based on a quantity of communication terminals belonging to the base station.

6. The management server according to claim 5, wherein the first available frequency list for the base station includes a frequency band that is wider as the quantity of communication terminals belonging to the base station is larger.

7. The management server according to claim 1, wherein the wireless setup information comprises a modulation method.

8. The management server according to claim 1, wherein the wireless setup information comprises a frequency band used as a carrier.

9. A base station comprising:
at least one processor configured to:
wirelessly communicate with a communication terminal;
acquire location information; and
transmit the location information and wireless setup information of the base station to a management server that creates an available frequency list by extracting a frequency based on the location information and the wireless setup information,
wherein the wireless setup information comprises a transmission power according to the available frequency list received from the management server.

10. The base station according to claim 9, wherein the wireless setup information comprises a modulation method.

11. The base station according to claim 9, wherein the wireless setup information comprises a frequency band used as a carrier.

12. A communication system comprising:
a base station including:
at least one first processor configured to:
wirelessly communicate with a communication terminal, set a carrier frequency of the base station, acquire location information, transmit the location information, and
transmit wireless setup information of the base station,
wherein the wireless setup information comprises a transmission power; and
a management server including:
at least one second processor configured to:
hold a location/frequency list in which location information and frequency information are associated,
create an available frequency list by extracting, from the location/frequency list, frequency information based on the wireless setup information received from the base station, and
transmit the available frequency list to the base station,
wherein the carrier frequency of the base station is set according to the available frequency list received from the management server.

13. The communication system according to claim 12, wherein the wireless setup information comprises a modulation method.

14. The communication system according to claim 12, wherein the wireless setup information comprises a frequency band used as a carrier.

15. A communication method comprising the steps of:
acquiring, by a base station, location information;
transmitting, by the base station, the acquired location information to a management server holding a location/frequency list in which location information and frequency information are associated;
transmitting, by the base station, wireless setup information of the base station,
wherein the wireless setup information comprises a transmission power creating, by the management server, an available frequency list by extracting, from the location/frequency list, frequency information based on: the location information received from the base station and the wireless setup information received from the base station;
transmitting, by the management server, the available frequency list to the base station; and
setting, by the base station, a carrier frequency according to the available frequency list received from the management server.

16. The communication method according to claim 15, wherein the wireless setup information comprises a modulation method.

17. The communication method according to claim 15, wherein the wireless setup information comprises a frequency band used as a carrier.

* * * * *